United States Patent [19]
Godeau et al.

[11] Patent Number: 6,155,610
[45] Date of Patent: Dec. 5, 2000

[54] SNAP-FASTENABLE COUPLING FOR A FLUID-TRANSFER HOSE

[75] Inventors: Denis Godeau, Vieilles Maisons/Joudry; Philippe Exandier, Panne, both of France

[73] Assignee: Hutchinson, Paris, France

[21] Appl. No.: 09/276,491

[22] Filed: Mar. 25, 1999

[30] Foreign Application Priority Data

Mar. 27, 1998 [FR] France .................................. 98 03818

[51] Int. Cl.⁷ .................................................... F16L 33/00
[52] U.S. Cl. ........................... 285/242; 285/243; 285/256
[58] Field of Search .................................. 285/241, 242, 285/243, 256

[56] References Cited

U.S. PATENT DOCUMENTS

| | | | |
|---|---|---|---|
| 4,723,948 | 2/1988 | Clark et al. ............................ | 285/243 |
| 5,131,687 | 7/1992 | Marchou ................................ | 285/242 |
| 5,209,527 | 5/1993 | Hohmann ............................... | 285/242 |
| 5,601,317 | 2/1997 | Crouse et al. ......................... | 285/242 |
| 5,875,820 | 3/1999 | Braun .................................... | 285/242 |

*Primary Examiner*—Dave W. Arola
*Attorney, Agent, or Firm*—Oblon, Spivak, McClelland, Maier & Neustadt, P.C.

[57] ABSTRACT

A snap-fastenable coupling for a low pressure fluid transfer hose, in particular for a motor vehicle, comprises two semicylindrical pieces mounted on a portion of hose made of rubber or the like that is engaged on an insert. The two pieces are fixed together by resilient snap-fastening and they simultaneously secure the hose to the insert in sealed manner. The pieces have elastically deformable front ends enabling them to snap-fasten resiliently onto a peripheral projection of the endpiece.

13 Claims, 4 Drawing Sheets

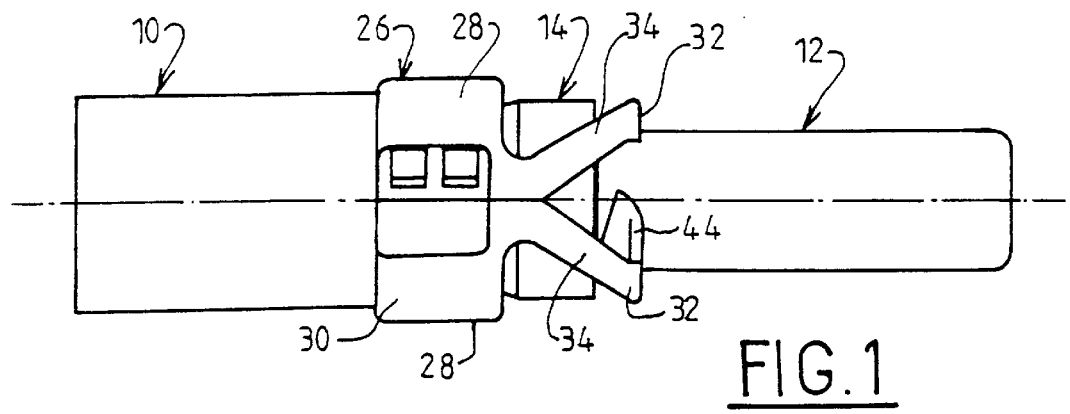
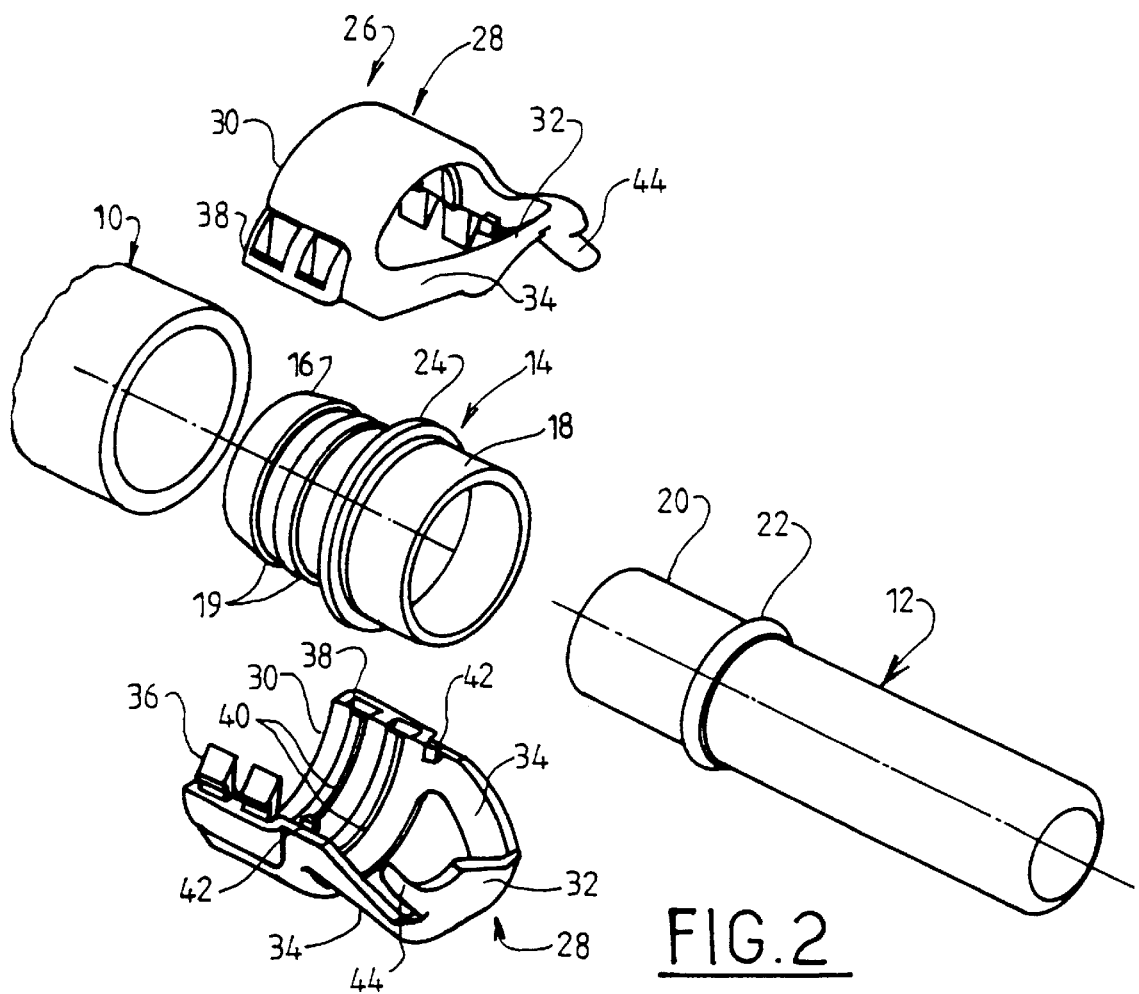

SNAP-FASTENABLE COUPLING FOR A FLUID-TRANSFER HOSE

The invention relates to a snap-fastenable coupling for a fluid-transfer hose, in particular for a motor vehicle, the coupling being intended for low pressure fluid-transfer hoses, e.g. such as the hoses of a circuit for cooling an internal combustion engine.

BACKGROUND OF THE INVENTION

Commonly, hose couplings of this type comprise a tubular insert mounted inside a flexible rubber hose or a flexible hose based on rubber or the like which is to be connected to a tubular endpiece of a fluid circuit, the endpiece being designed to be inserted in sealed manner inside the insert. In general, the hose is fixed on the insert by means of a crimping ring which presses the hose in sealed manner on the insert.

The connection with the endpiece is sealed by means of a gasket disposed between the endpiece and the insert. Means are generally provided for locking the connection, which means surround the hose and the endpiece and co-operate with one another by resilient snap-fastening so as to hold the endpiece engaged in the insert.

Such couplings must also be simple and as low in cost as possible, and they must simultaneously be very reliable. It is also desirable for them to be quick and easy to assemble and for them to enable the hose to be disconnected from the endpiece by an operation that is quick and simple, and that can preferably be performed by hand without using a tool.

OBJECTS AND SUMMARY OF THE INVENTION

A particular object of the invention is to satisfy this need, by means of a snap-fastenable coupling that satisfies all of the above-specified conditions.

To this end, the invention provides a coupling comprising a tubular insert mounted inside a flexible hose for connecting to a tubular endpiece of a fluid circuit, the endpiece being designed to be inserted in sealed manner inside the insert and having a peripheral projection in the vicinity of its free end, and locking means for locking the connection between the hose and the endpiece, said means surrounding the hose and the endpiece and co-operating with one of them by resilient snap-fastening to hold the endpiece engaged in the insert, wherein the locking means comprise, at their hose end, a cylindrical annular portion surrounding the hose and clamping it in sealed manner on the insert, and at their endpiece end, elastically deformable longitudinal tabs which are attached to said annular portion and which co-operate by catching on the peripheral projection of the endpiece to oppose disconnection of the hose from the endpiece.

In the coupling of the invention, the locking means combine the functions of fixing the hose in sealed manner on the insert and of maintaining the connection between the hose and the endpiece by resilient snap-fastening on the endpiece.

In a preferred embodiment of the invention, the locking means are formed by two semicylindrical pieces having fixing means for fixing them one to the other, at the end where the hose is clamped on the insert.

Advantageously, the two semicylindrical pieces are identical and their fixing means for fixing them one to the other are of the resilient snap-fastening type.

In one embodiment, the pieces are made of a plastics material that includes a reinforcing filler, e.g. a polyamide filled with glass fibers.

In a variant, the pieces are made of metal.

The locking means can also be made out of a single piece of metal with the cylindrical annular portion thereof being fixed by crimping on the hose mounted on the insert.

According to yet another characteristic of the invention, the semicylindrical portions of the locking means which co-operate by catching on the peripheral projection of the endpiece comprise side tabs which, by applying thrust on the tabs in opposite directions, serve to move the semicylindrical portions apart from each other so as to disengage the peripheral projection of the endpiece and enable the hose to be disconnected from the endpiece.

This disconnection is easily done by hand and without any special tool.

BRIEF DESCRIPTION OF THE DRAWINGS

The invention will be better understood and other characteristics, details, and advantages thereof will appear more clearly on reading the following description given by way of example and with reference to the accompanying drawings, in which:

FIG. 1 is a diagrammatic side view of a coupling of the invention.

FIG. 2 is an exploded perspective view of the coupling;

MORE DETAILED DESCRIPTION

Figure 3:
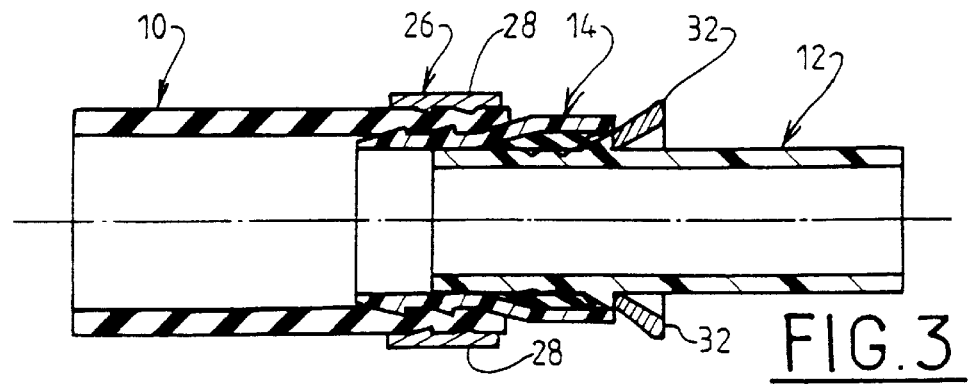
FIG. 3 is a diagrammatic axial section view of a variant embodiment of the coupling.

Reference is made initially to FIGS. 1 and 2 which show a first embodiment of a coupling of the invention enabling a hose 10 and a tubular endpiece 12 of a fluid circuit to be connected and disconnected quickly, the hose 10 typically being made of, or based on, rubber or the like, possibly with textile reinforcement, and the tubular endpiece 12 being made of any appropriate rigid material, e.g. a plastics material or metal.

The coupling of the invention comprises a cylindrical tubular insert 14 made in particular out of rigid plastics material and comprising an end 16 for inserting by force into the hose 10, and an end 18 designed to receive the free end 20 of the endpiece 12.

The outside surface of the end 16 of the insert 14 is shaped to have one or more annular ribs 19, e.g. of the "Christmas tree" type, thereby improving fixing of the hose 10 on the insert 14, and sealing the fixing better.

The other end 18 of the insert 14 is cylindrical in shape and, for example, it includes a rubber gasket molded over its inside surface for the purpose of sealing it relative to the free end 20 of the endpiece 12.

In the vicinity of its free end 20, the endpiece has an annular peripheral projection 22 whose outside diameter is substantially equal to or very slightly smaller than the inside diameter of the end 18 of the insert 14, so as to be received with a very small amount of clearance inside said end 18.

Advantageously, the insert 14 has an annular rib 24 projecting from its outside surface to form a separation between the ends 16 and 18 and to ensure accurate axial positioning of the hose 10 on the insert 14 by abutment.

Means 26 for locking the connection between the hose 10 with its insert 14 and the endpiece 12 are formed by two semicylindrical pieces 28 having the function of ensuring that the hose 10 is fixed in sealed manner on the insert 14 by clamping, and the function of holding the endpiece 12 inside the insert 14 by snap-fastening or catching the peripheral projection 22 of the endpiece.

For example, each piece 28 is made of a plastics material that includes a reinforcing filler, and in particular it can be made of a polyamide filled with glass fibers, and it comprises a rear portion or "hose end" portion 30 in the form of a half-cylinder, and a front portion 32 or "endpiece end" portion in the form of a half-cylinder attached to the rear portion 30 by two longitudinal tabs 34.

The two pieces 28 are fixed together by snap-fastening, and for this purpose they have claws or catches 36 along one edge of their semicylindrical portions 30, and housings 38 for receiving the claws on the other edge of their semicylindrical portions 30. As can be seen in FIG. 2, it suffices to place the two pieces 28 on either side of the hose 10 when it is engaged on the insert 14, and then to push the pieces towards each other so as to fix the locking means 26 on the portion of the hose 10 that is engaged on the insert 14, and so as to fix said portion of the hose 10 in sealed manner on the insert.

To improve the sealing of this fixing, annular ribs 40 can be formed on the inside surfaces of the semi-cylindrical portions 30 of the pieces 28 and are offset in a staggered configuration relative to the ribs 19 of the insert 14 so as to compress the portions of the hose 10 which lie between two annular ribs 19, and vice versa.

In addition, each piece 28 can have two abutments 42 enabling it to be positioned so that it presses against the peripheral rim 24 of the insert 14.

When the two pieces 28 are assembled together as shown in FIG. 1, the radial or transverse distance between their front ends 32 is smaller than the diameter of the peripheral rib 22 of the endpiece 12. Consequently, when the endpiece is engaged inside the insert 14, the front ends 32 of the locking means 26 are splayed apart from each other resiliently when the peripheral rib 22 goes past, and they then drop back to press against the endpiece 12 behind the rib, thereby preventing the endpiece being withdrawn from the insert 14.

Advantageously, each front end 32 of a piece 28 has a side tab 44 which, in the example shown, extends more or less tangentially to said front end 32. By using two fingers to push the tabs 44 in opposite directions, the front portion of the locking means 26 can be opened and the ends 32 can be moved far enough apart from each other to allow the peripheral rib 22 of the endpiece 12 to pass between them, thereby disengaging the endpiece from the insert 14.

In a variant embodiment, the two pieces 28 can be connected to each other by a flexible hinge formed on their rear portions 30 along a generator line, i.e. parallel to their longitudinal axis.

Figure 4:
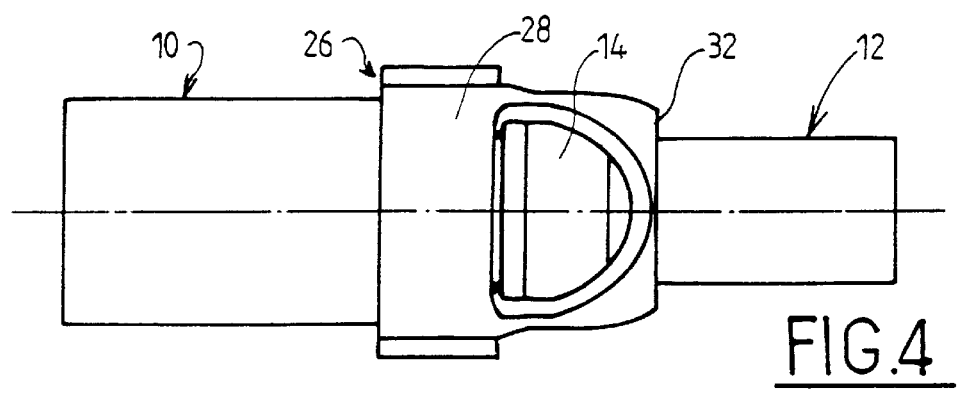
FIGS. 4 and 5 are a plan view and a side view respectively of the coupling.
Figure 5:
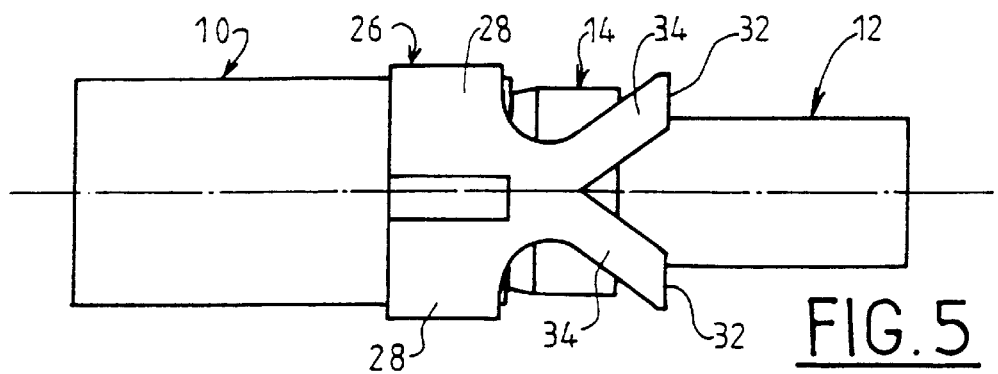

In the variant shown diagrammatically in FIGS. 3 to 5, the snap-fastenable coupling is of substantially the same structure as shown in FIGS. 1 and 2, but it is made of metal, e.g. of steel or aluminum. As in the preceding embodiment, it is made of two semicylindrical pieces 28 which are fixed to each other by snap-fastening.

Figure 6:
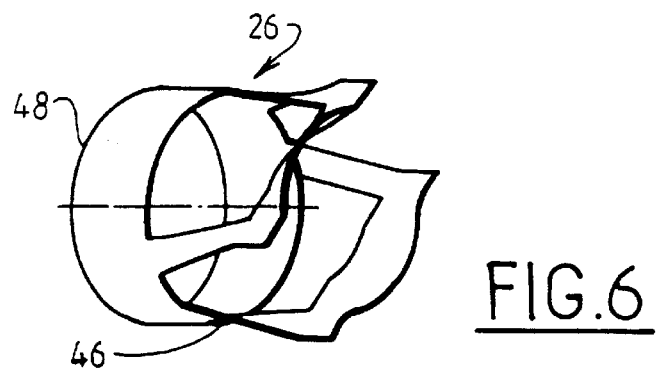
FIG. 6 is a diagrammatic perspective view of a variant embodiment of the locking means.

In another variant, as shown in FIG. 6, the locking means 26 are constituted by a single metal piece 46 having a cylindrical rear end 48 surrounding the portion of the hose 10 which is mounted on the insert 14, and fixed on said portion of the hose by crimping, thereby also securing the hose 10 in sealed manner on the insert 14.

Figure 7:
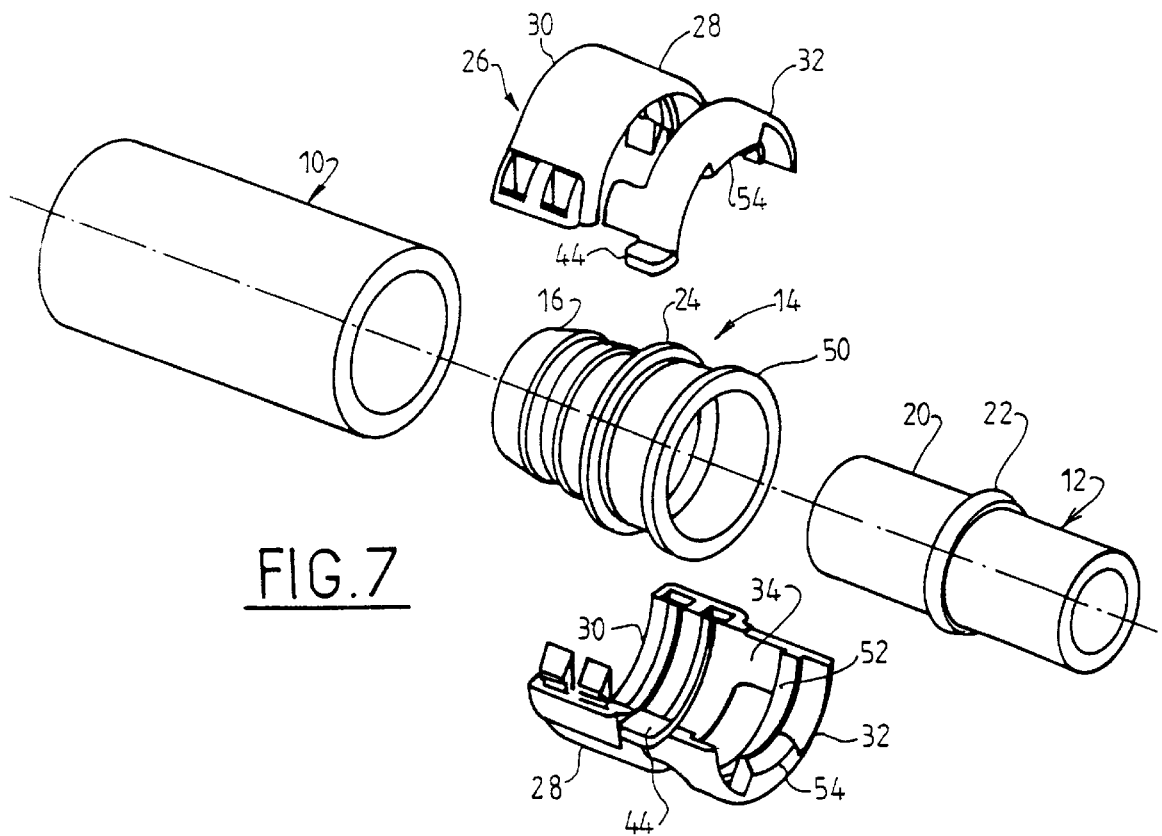
FIGS. 7, 8, and 9 are perspective and axial section views showing a variant embodiment of the coupling.
Figure 8:
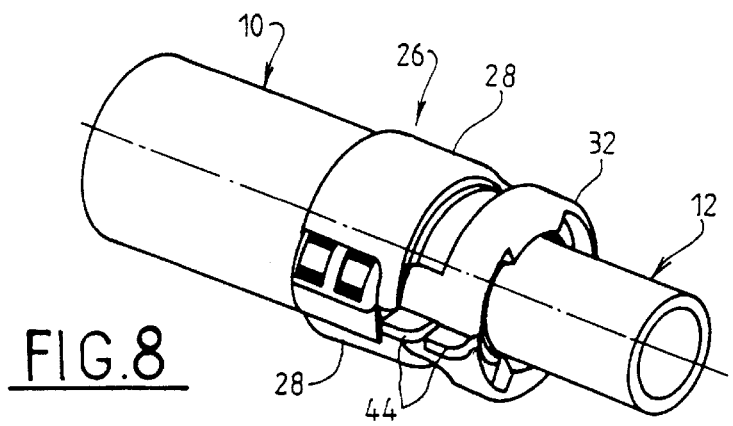
Figure 9:
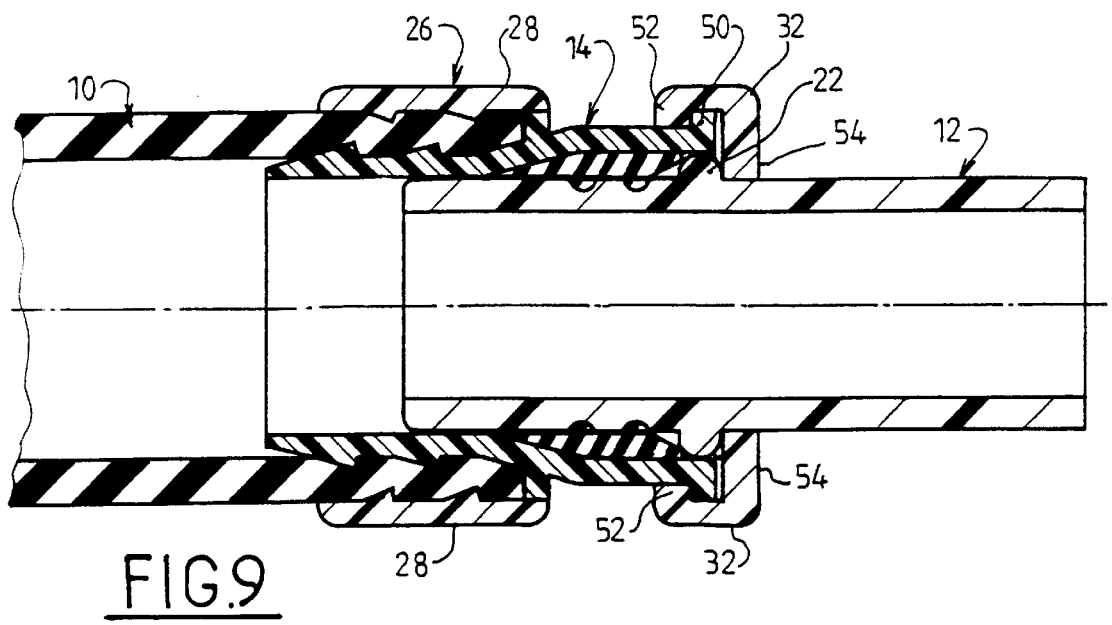

In the embodiment shown in FIGS. 7, 8, and 9, the locking means 26 are made of two semicylindrical pieces 28 of plastics material which are identical to each other in their rear portions 30 and which are mirror images of each other in their front portions 32, said pieces 28 having substantially the same characteristics as the pieces shown in FIGS. 1 and 2, with the exception of the following:

Firstly, the front portion 32 of each piece 28 is connected to the rear proton 30 via a single longitudinal tab 34 only, and at its end that is not attached to the rear portion 30 has a side tab 44 which extends perpendicularly to said end, as can clearly be seen in FIG. 7.

Furthermore, the front portion of the insert 14 is terminated by an annular collar 50 and each piece 28 of the locking means 26 comprises, on its inside face, a semicircular rib 52 for co-operating with said annular collar 50 of the insert 14 by coming into abutment therewith.

Finally, the front portion 32 of each piece 28 has, in the middle thereof, a catch 54 extending radially inwards and designed to co-operate with the peripheral projection 22 of the endpiece 12.

The locking means 26 are assembled and fixed onto the portion of the hose 10 that is engaged on the insert 14 in the same manner as described above with reference to FIGS. 1 and 2, by placing the two pieces 28 on either side of the end of the hose 10 and by pushing the two pieces towards each other so as to fix them together by snap-fastening while simultaneously fixing the hose 10 in sealed manner on the insert 14.

As before, coupling is established by pushing the hose 10 together with the insert 14 onto the end 20 of the endpiece 12, until the catches 54 are beyond the peripheral projection 22 on the endpiece 12 (FIGS. 8 and 9).

If a force is then exerted on the hose 10 and/or the endpiece 12 tending to separate them from each other, the removal force applied by the peripheral projection 22 of the endpiece 12 to the catches 54 of the locking means 26 is taken up by the annular collar 50 of the insert 14 because of the internal ribs 52 of the pieces 28 coming into abutment against said annular collar.

The coupling of the invention can thus withstand relatively high axial forces tending to uncouple it.

Furthermore, the hose 10 can be disconnected from the endpiece 12 simply and easily by pushing in opposite directions against the tabs 44 with two fingers. This operation is made easier by having the two tabs 44 close together (FIG. 8), and by the front portions 32 of the pieces 28 being connected to the rear portions thereof via respective single longitudinal limbs 34, thus making it possible to move these front ends 32 away from the peripheral projection 22 of the endpiece 12 by applying only a small amount of force to them.

Figure 10:
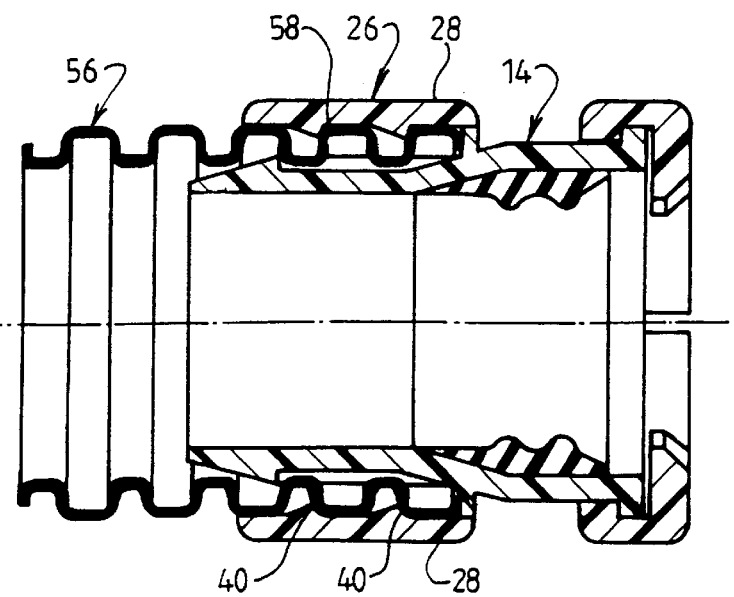
FIG. 10 is an axial section view of another variant of the coupling.

FIG. 10 shows another variant embodiment of a coupling of the invention applicable to the case when the rubber hose 10 of the preceding embodiments is replaced by a ringed hose 56 made of plastics material. In this case, the locking means 26 can be the same type as described above, however the rear portion of the insert 14 has external overmolding of rubber or the like 58 for sealing the end of the hose 56 which is engaged on said rear portion of the insert 14.

As shown in the drawings, this overmolded gasket 58 preferably extends over a distance that is greater than the pitch of two successive undulations of the ringed hose 56 so as to improve sealing.

Furthermore, the distance between the internal ribs 40 of the pieces 28 corresponds to the pitch between the undulations of the hose 56 so that these ribs can penetrate between the undulations and can lock the end of the hose 56 as engaged on the insert 14.

Otherwise, the characteristics of the locking means 26 and of the insert 14 are identical to those described above.

When the hose 56 has a cylindrical (non-ringed) end engaged on the insert 14, the same locking means 26 can be used if the cylindrical end of the hose 56 is formed on its outside surface with an annular projection that is received between two annular ribs 40 of the locking means 26.

The invention applies in particular to all couplings for low pressure fluid transfer hoses used in the automobile industry, and also in any other type of industry.

What is claimed is:

1. A snap fastenable coupling for a fluid transfer hose, comprising:

a tubular insert mountable inside a flexible hose, and configured to sealingly mount a tubular endpiece of a fluid circuit; and a snap-fastening locking part comprising a cylindrical annular portion mountable to the hose to sealingly clamp the hose onto said tubular insert when said tubular insert is mounted inside the flexible hose, said snap-fastening locking part further comprising elastically deformable longitudinal tabs extending from said cylindrical annular portion, and two diametrically opposed semi-annular portions connected to said tabs at positions to engage a peripheral projection of said tubular endpiece when the tubular endpiece is mounted to said tubular insert, thereby holding the tubular endpiece on said insert and locking a connection between the tubular endpiece and the hose.

2. The coupling according to claim 1, wherein said locking part comprises two semi-cylindrical pieces, and cooperating lock elements on each of the semi-cylindrical pieces.

3. The coupling according to claim 2, wherein said semi-cylindrical pieces are identical and said lock elements are resilient snap fasteners.

4. A coupling according to claim 2, wherein the two semi-cylindrical pieces are made of plastics material including a reinforcing filler.

5. A coupling according to claim 2, wherein the two semi-cylindrical pieces are connected to each other by a flexible hinge formed along a generator line of their cylindrical surface.

6. A coupling according to claim 2, wherein the semi-cylindrical pieces have respective semicircular ribs on their inside faces that co-operate by abutment with an annular collar of the insert to transfer axial separation forces applied to the hose and/or the endpiece.

7. A coupling according to claim 1, wherein each said semi-annular portion is connected to the annular portion of the locking part by a single longitudinal tab.

8. A coupling according to claim 1, wherein the have unlocking side tabs.

9. A coupling according to claim 1, wherein the locking part comprises internal annular ribs.

10. A coupling according to claim 9, wherein the annular ribs of the locking part are offset in a staggered configuration relative to ribs of the insert which bear against the inside surface of the hose.

11. A coupling according to claim 1, wherein said hose is a ringed hose of plastics material, and wherein a gasket of rubber or the like is overmolded onto the portion of the insert that is to be inserted into the ringed hose.

12. A coupling according to claim 1, wherein the two semicylindrical pieces are made of metal.

13. A coupling according to claim 1, wherein the locking part is made as a single piece of metal having a cylindrical annular portion fixed on the hose mounted on the insert by crimping.

* * * * *